(12) United States Patent
Wong et al.

(10) Patent No.: US 10,379,841 B2
(45) Date of Patent: Aug. 13, 2019

(54) FACILITATING AUTOMATIC CONTAINER UPDATING WITHIN A CONTAINER-BASED ENVIRONMENT

(71) Applicant: INTERNATIONAL BUSINESS MACHINES CORPORATION, Armonk, NY (US)

(72) Inventors: Chih-Hong Wong, Beijing (CN); Xin Peng Liu, Beijing (CN); Yuan Yuan Jia, Beijing (CN); Dan Qing Huang, Beijing (CN)

(73) Assignee: INTERNATIONAL BUISNESS MACHINES CORPORATION, Armonk, NY (US)

( * ) Notice: Subject to any disclaimer, the term of this patent is extended or adjusted under 35 U.S.C. 154(b) by 13 days.

(21) Appl. No.: 15/782,998

(22) Filed: Oct. 13, 2017

(65) Prior Publication Data

US 2019/0114164 A1    Apr. 18, 2019

(51) Int. Cl.
*G06F 9/44*   (2018.01)
*G06F 8/658*  (2018.01)

(52) U.S. Cl.
CPC .................. *G06F 8/658* (2018.02)

(58) Field of Classification Search
None
See application file for complete search history.

(56) References Cited

U.S. PATENT DOCUMENTS 8,196,152 B2 *   6/2012   Tang ........................ G06F 9/52
                                                            717/110
9,898,354 B2 *   2/2018   Engel ...................... G06F 9/541
10,154,065 B1*  12/2018   Buchler ................. H04L 63/20
(Continued)

FOREIGN PATENT DOCUMENTS

CN         106528224 A      3/2017
WO     WO 2016/099346 A1    6/2016

OTHER PUBLICATIONS

How to automatically update your docket containers, if base-images are updated, https://stackoverflow.com/questions/26423515/how-to-automatically-update-your-docker-containers-if-base-images-are-updated, StackOverflow, Jun. 2014-2017.*

(Continued)

*Primary Examiner* — Insun Kang
(74) *Attorney, Agent, or Firm* — Michael A. Petrocelli, Esq.; Kevin P. Radigan, Esq.; Heslin Rothenberg Farley & Mesiti P.C.

(57) ABSTRACT

A facility is provided for automatically updating a version of a base image included within an application container of a container-based processing environment. The facility includes providing an application container having an associated configuration file with automatic update specified in connection with a referenced based image. The application container includes an existing version of the referenced base image. Availability of an updated version of the base image with the container-based processing environment is identified, and based on identifying availability of the updated version of the base image, the application container is automatically updated to an updated container, which includes the updated version of the base image.

15 Claims, 13 Drawing Sheets

(56) References Cited

U.S. PATENT DOCUMENTS

| | | | | |
|---|---|---|---|---|
| 2010/0306754 | A1* | 12/2010 | Javed | G06F 9/44521 717/152 |
| 2016/0205518 | A1 | 7/2016 | Patel et al. | |
| 2017/0054759 | A1* | 2/2017 | Lee | H04L 63/20 |
| 2017/0093923 | A1 | 3/2017 | Duan | |
| 2017/0116042 | A1* | 4/2017 | Xu | G06F 9/5083 |
| 2017/0116415 | A1* | 4/2017 | Stopel | G06F 21/554 |
| 2017/0228246 | A1* | 8/2017 | Kotha | G06F 9/45558 |
| 2017/0255462 | A1* | 9/2017 | Azagury | G06F 8/76 |
| 2017/0264684 | A1* | 9/2017 | Spillane | H04L 67/1095 |
| 2017/0322824 | A1* | 11/2017 | Reuther | G06F 3/0604 |
| 2017/0374151 | A1* | 12/2017 | Moorthi | H04L 67/1097 |
| 2018/0032410 | A1* | 2/2018 | Kang | G06F 11/1469 |
| 2018/0052675 | A1* | 2/2018 | Ghosh | G06F 11/3604 |
| 2018/0075152 | A1* | 3/2018 | Zhang | G06F 9/5083 |
| 2018/0088926 | A1* | 3/2018 | Abrams | G06F 8/65 |
| 2018/0129479 | A1* | 5/2018 | McPherson | G06F 11/3668 |
| 2018/0137306 | A1* | 5/2018 | Brady | G06F 21/64 |
| 2018/0144123 | A1* | 5/2018 | Levin | G06F 21/53 |
| 2018/0189122 | A1* | 7/2018 | Jobi | G06F 9/545 |
| 2018/0189176 | A1* | 7/2018 | Jobi | G06F 12/0253 |
| 2018/0267990 | A1* | 9/2018 | Cherukuri | G06F 17/30174 |
| 2018/0268115 | A1* | 9/2018 | Zhang | G06F 8/63 |
| 2018/0278639 | A1* | 9/2018 | Bernstein | G06F 21/577 |
| 2018/0285210 | A1* | 10/2018 | Mitkar | G06F 11/1469 |
| 2018/0336345 | A1* | 11/2018 | Georgiev | G06F 21/53 |
| 2018/0341471 | A1* | 11/2018 | Stefanov | G06F 8/60 |
| 2018/0373505 | A1* | 12/2018 | Engquist | G06F 8/40 |

OTHER PUBLICATIONS

Dockerfile reference, Docker Inc, https://docs.docker.com/engine/reference/builder/ (cached 2015).*

Watchtower, https://github.com/v2tec/watchtower, GitHub, cached Aug. 15, 2015.*

"How to Handle Security Updates Within Docker Containers?", https://serverfault.com/questions/611082/how-to-handle-security-updates-within-docker-containers, [Retrieved from the Internet on Jun. 15, 2017] (pp. 1-2).

"How to Automatically Update Your Docker Containers, if Base-Images are Updated", https://stackoverflow.com/questions/26423515/how-to-automatically-update-your-docker-containers-if-basie-images-are-updated, [Retrieved from the Internet on Jun. 15, 2017] (pp. 1-5).

"Automatically Update Running Docker Containers", https://github.com/v2tec/watchtower, [Retrieved from the Internet on Jun. 15, 2017] (pp. 1-5).

Mel, et al., "The NIST Definition of Cloud Computing," National Institute of Standards and Technology, Information Technology Laboratory, Special Publication 800-145, Sep. 2011, (pp. 1-7).

International Business Machines Corporation (IBM), "z/Architecture Principles of Operation," IBM® Publication No. SA22-7832-10, Eleventh Edition, Mar. 2015, (pp. 1-1732).

International Business Machines Corporation (IBM), "Power ISA™ Version 2.07B," International Business Machines Corporation, Apr. 9, 2015, (pp. 1-1527).

\* cited by examiner

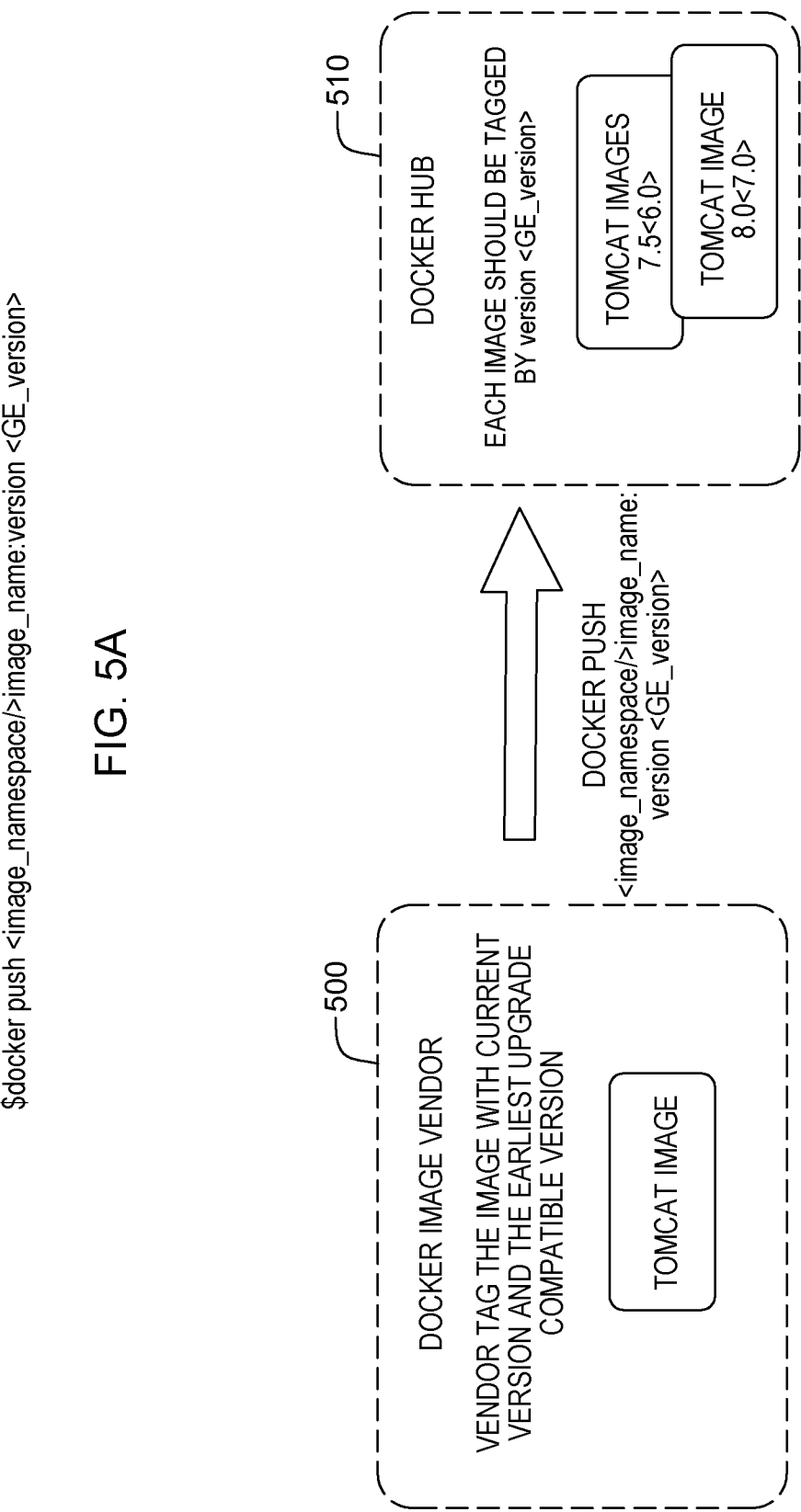

FACILITATING AUTOMATIC CONTAINER UPDATING WITHIN A CONTAINER-BASED ENVIRONMENT

BACKGROUND

As one example of a container-based data processing system, Docker™ is an open platform for developing, shipping, and running applications. (Docker and other Docker-based marks discussed herein are trademarks or registered trademarks of Docker, Inc., of San Francisco, Calif., USA.) At their core, such systems provide a way to run almost any application securely isolated in a container. A container may consist of an application, user-added files, and metadata for an application. Each container is built from an image, which may specify what the container holds, what process to run when the container is launched, and a variety of other configuration data. The image is a read-only template from which the container is launched. The image may consist of a series of layers and be built from one or more base images.

An image can be built from one or more base images using a set of instructions, each of which creates a new layer in the image. According to current design, when a container runs from an existing image, the version of base image used by the container cannot be changed. This restriction could cause issues due to one or more base images becoming out of date, potentially negatively affecting operation of the container.

SUMMARY

Certain shortcomings of the prior art are overcome and advantages are provided through the provision of a computer-implemented method for facilitating processing within a container-based processing environment. The computer-implemented method includes providing an application container. The application container has an associated configuration file with automatic update specified in connection with a referenced base image, and the application container includes an existing version of the base image. The method further includes identifying availability of an updated version of the base image within the container-based processing environment, and based on identifying availability of the updated version of the base image, automatically updating the application container to an updated container, where the updated container includes the updated version of the base image.

Systems and computer program products relating to one or more aspects are also described and claimed herein. Further, services relating to one or more aspects may also be described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5A depicts one embodiment of an instruction for pushing an updated base image from an image vendor to an image hub (such as Docker Hub) of a container-based processing environment, in accordance with one or more aspects of the present invention;

FIGS. 5B & 5C depict one embodiment of a process for pushing a base image from an image vendor to an image hub with <version><GE_version> information provided, in accordance with one or more aspects of the present invention;

DETAILED DESCRIPTION

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired by a particular application, for instance, for facilitating processing within a container-based processing environment by providing a facility for automatic software updating within the container-based processing environment.

The illustrative embodiments may be described using specific code, designs, architectures, protocols, layouts, schematics, or tools only as examples, and are not limiting to the illustrative embodiments. Furthermore, the illustrative embodiments are described in some instances using particular software, tools, and data processing environments only as example for clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

Figure 1:
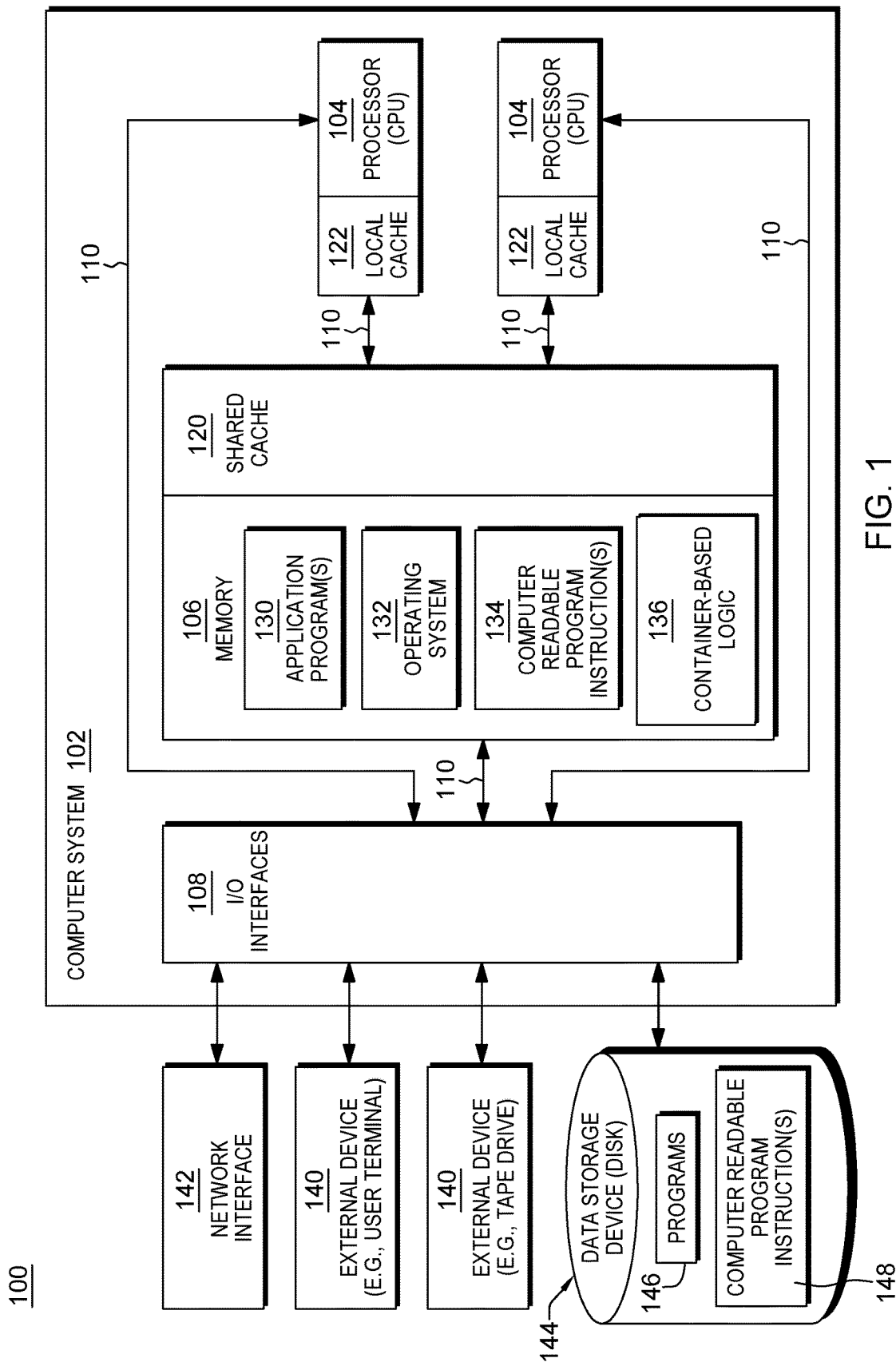
FIG. 1 depicts a block diagram of one embodiment of a data processing system which may implement processing or a processing environment, in accordance with one or more aspects of the present invention.

With reference to the figures, and in particular with reference to FIG. 1, an example diagram is shown of a data processing environment in which illustrative embodiments may be implemented. FIG. 1 is only an example and is not intended to assert or imply any limitation with regard to the environments in which different embodiments may be implemented. A particular implementation may make many modifications to the depicted environment based on the following description.

With reference to FIG. 1, as noted this figure depicts a block diagram of a data processing system in which one or more aspects of the present invention may be implemented. Data processing system 100 is an example of a computer, such as server, or other type of device, in which computer usable program code or instructions implementing one or more processes may be located for the illustrative embodiments.

In one example, data processing system 100 may be based on the z/Architecture, offered by International Business Machines Corporation, Armonk, N.Y. One embodiment of the z/Architecture is described in "z/Architecture Principles of Operation," IBM Publication No. SA22-7832-10, Mar. 2015, which is hereby incorporated herein by reference in its entirety. z/ARCHITECTURE is a registered trademark of International Business Machines Corporation, Armonk, N.Y., USA.

In another example, the processing system may be based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The data processing system may also be based on other architectures, including, but not limited to, the Intel x86 architectures. Other examples also exist.

As shown in FIG. 1, data processing system 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses and/or other connections 110.

Processor 104 includes a plurality of functional components used to execute instructions. These functional components include, for instance, an instruction fetch component to fetch instructions to be executed; an instruction decode unit to decode the fetched instructions and to obtain operands of the decoded instructions; instruction execution components to execute the decoded instructions; a memory access component to access memory for instruction execution, if necessary; and a write back component to provide the results of the executed instructions.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130, an operating system 132, and one or more computer readable program instructions 134, as well as image and/or container-based processing logic 136 such as disclosed herein. Additionally, or alternatively computer readable program instructions 134 may be configured to carry out one or more other functions of certain embodiments of the invention.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of one or more aspects of the present invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As noted, the depicted example in FIG. 1, and discussed above, is not meant to imply architectural limitations. Further, as noted, data processing system 100 of FIG. 1 could be, for instance, a server, workstation, tablet computer, laptop computer, or other device.

Figure 2:
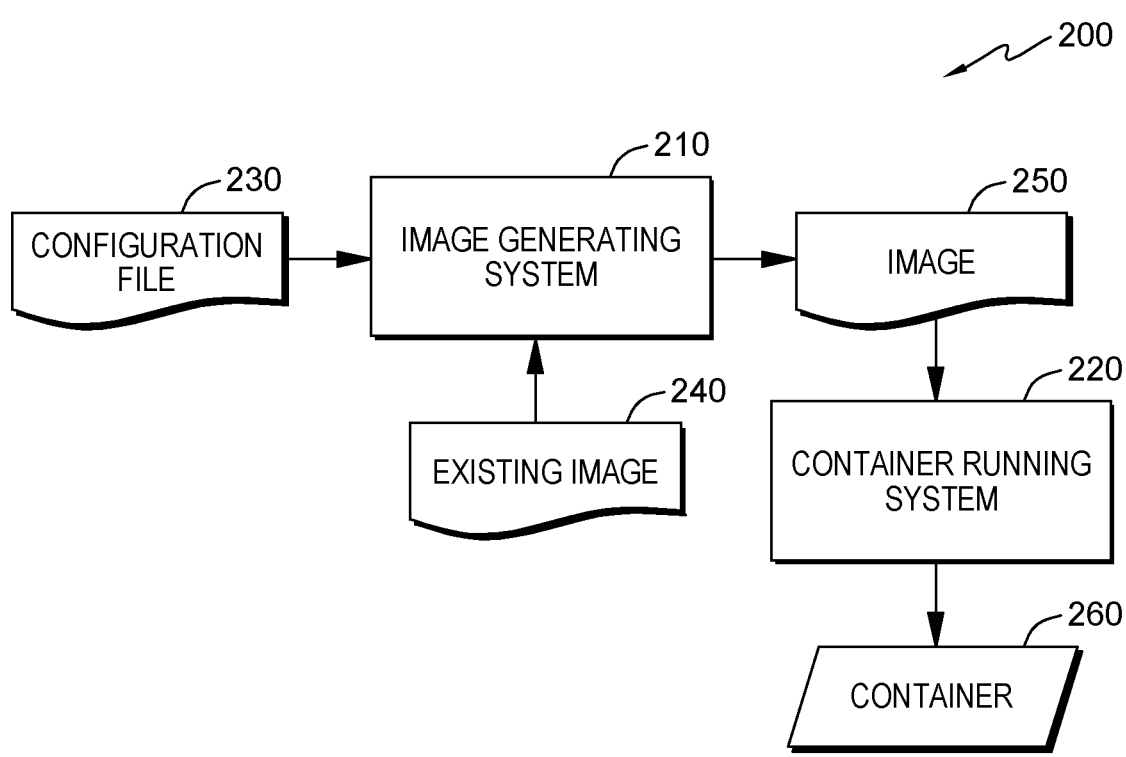
FIG. 2 depicts one embodiment of processing, in accordance with one or more aspects of the present invention.

FIG. 2 shows an environment 200 in which one or more embodiments of the present disclosure can be implemented. It is again to be understood that the structure and functionality of environment 200 are described only for the purpose of illustration without suggesting any limitations as to the scope of the present disclosure. The embodiments of the present disclosure can be embodied, in one or more other implementations, with different structure and/or functionality.

As illustrated in FIG. 2, processing environment 200 may generally include an image generating system 210 and a container running system 220. In one or more embodiments, the image generating system 210 and/or the container running system 220 may be implemented by a computer system, such as discussed above with reference to FIG. 1, for example. Some embodiments of the present disclosure may include two phases: an image generating phase and a container running phase.

During the image generating phase, the image generating system 210 may be configured to generate an image 250 based on a configuration file 230 and one or more existing images 240. As described above, an image can be built from one or more base images using a set of instructions. The base image(s) may be contained in the existing image 240, and these instructions may be stored in the configuration file 230 (also called a "Dockerfile" in Docker). For example, the configuration file 230 may be a text-based script that contains instructions for generating the image 250. The image generating system 210 may read the configuration file 230 when the generation of the image 250 is requested, execute the instructions, and return the generated image 250.

Specifically, the instructions in configuration file 230 may be executed step-by-step. When executing each of the instructions, an intermediate container may be created so that the instruction is run inside the intermediate container. In this way, the intermediate container may contain all changes that need to be made to the underlying layers. Then, a copy of the intermediate container may be committed to an image. After all the instructions have been executed, the intermediate containers can be removed and the image 250 will be left. During the container running phase, the container running system 220 may be configured to read the image 250 to run the container 260.

In the following discussion, various embodiments of the present disclosure are discussed and principally illustrated in conjunction with Docker as an example of a container-based processing environment. It is to be understood that this is only for the purpose of illustration, without suggesting any limitations to the scope of the present disclosure. Examples of other containerized technologies exist in the art.

Every Docker image consists of a set of layers. The dependencies of the layers are defined in the configuration file (i.e., the Dockerfile). The configuration file describes a base image for the build using, in part, a FROM instruction. The FROM instruction implicitly uses a base registry from which the base image is pulled. According to current restrictions, once a container runs from an existing image, the base image is not able to be changed for that running container. This might cause issues where the base image may become out of date. For instance, software within a container-based processing environment may need to be upgraded periodically due to, for instance, a security vulnerability, enhanced features being added, etc. If there is no manual update command available within the processing environment, then software of a particular container may stay in the version when the associated Docker image was built, which as noted, could cause issues due to one or more of the base images being out of date.

One approach to the issue would be to allow a container to run from an existing image, without the layers being allowed to change within that container. If an upgrade to a layer is required, then a new image would need to be built, and the container run from the new image. Although workable, this approach is disadvantageous in terms of lost time and likely service outage to the customer(s). Another possible approach is to maintain the base image, but impose all upgradable parts as a script to be run periodically when the container is launched. This approach, however, has obvious drawbacks. Depending on the number of changeable parts, a very large script may be required, which could be time consuming to launch. The complexity of this approach would also require maintenance efforts to make sure the script is continually correct. Also, it would not be possible to keep unchanged subparts within the changeable parts.

Figure 3:
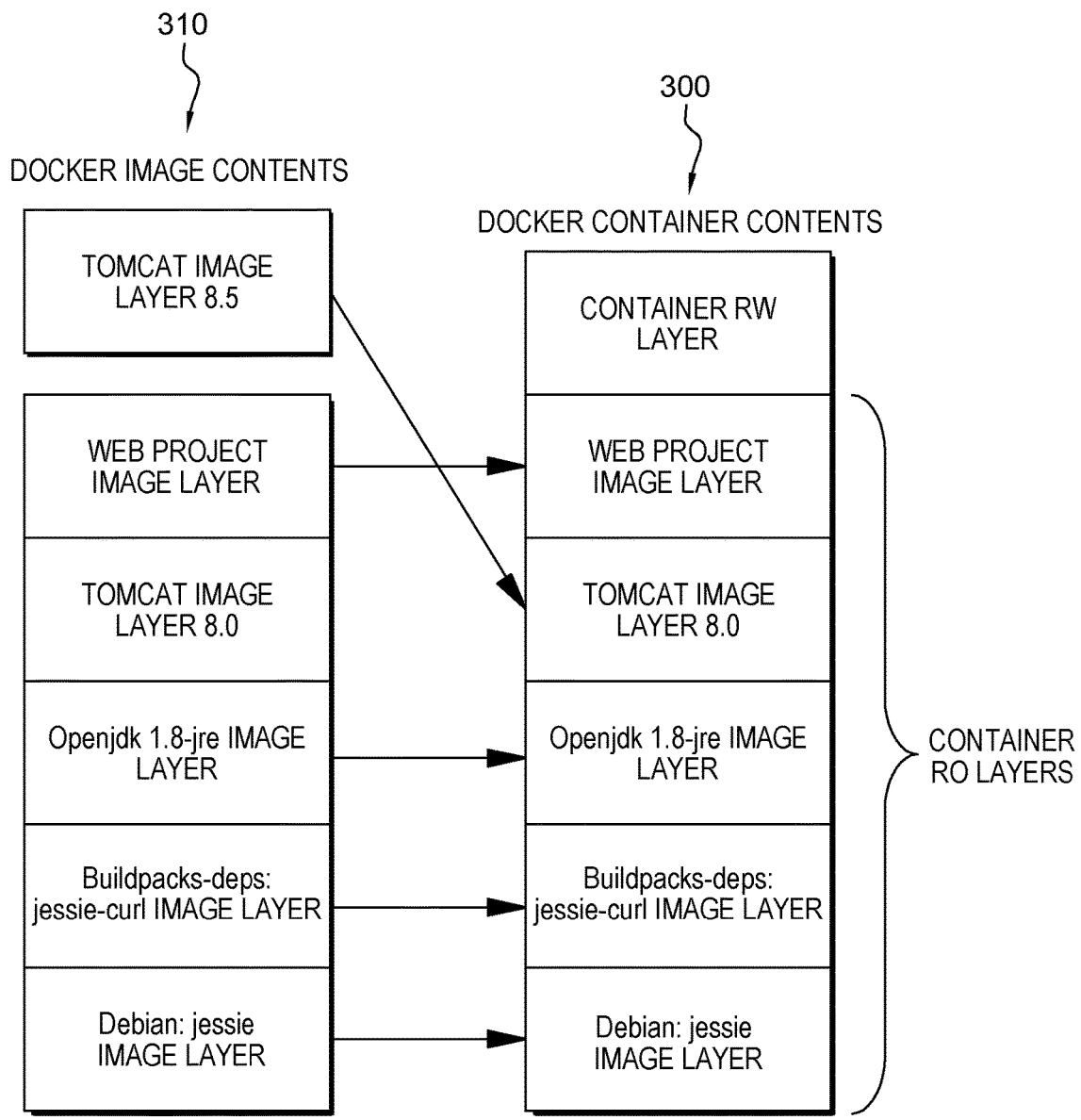
FIG. 3 depicts an example of available Docker image contents associated with different layers of a running Docker container, in accordance with one or more aspects of the present invention.

FIG. 3 illustrates the issue further, where by way of example, certain Docker container layers 300 are illustrated for a running container, with current versions of Docker image contents 310 also being identified. As shown, the running container 300 consists of four base images, one on top of the other. In the example shown, the running container includes a web project image layer that contains JS, HTML, CSS, and Java projects. The Tomcat server image provides a web server, the Openjdk image is a Java platform, the Buildpak-deps image has a collection of common build dependencies, and the Debian:jessie image is a linux distribution. The application layer is added, in this example, on top of the Tomcat 8.0 image. As depicted, in one or more implementations, the application layer and the base image layers are read only (RO) layers, rather than using fixed layers.

As shown in FIG. 3, assume that Tomcat 8.5 is now generally available, and its Docker image is available on the Docker Hub. In accordance with one or more aspects of the present invention, the Tomcat 8.5 layers may be automatically substituted for the running container to replace the existing Tomcat 8.0 layers, that is, with restarting the updated container to pick up the changes. Similar processing can be applied to, for instance, the Openjdk image layer or any Linux-based image layers.

In one or more implementations, disclosed herein is the use of an automatic version update indicator to direct automatic upgrading of one or more base image layers identified within the container. In one or more implementations, each image is assumed to have a multi-level version scheme, such as <major><minor><patch>. Within this version scheme, an indicator such as "*" may be used to enable a latest base image to be referenced within the container during running of the container. In one or more embodiments, a container (or application container) is only being updated, with the original image, such as the original Docker image, remaining unchanged within the container-based processing environment. By selectively placing the indicator within the version scheme, the indicator may be used to specify to the Docker engine the scope or degree within the multi-level version scheme of the base image with which automatic upgrades are allowed. Generally, upgrading to a latest major-version update may entail more risk than upgrading to a latest patch-version update under certain fixed major-versions or major.minor combinations. Thus, users or developers can adjust their upgrade policy according to their requirements. Using this approach, unwanted upgrades may be avoided that could potentially interrupt or break the application running within the container. For instance, placing or associating the indicator with the <major> position may mean that any automatic upgrades to the latest version of the base image for this container are allowed, while placing the indicator at the <minor> location may mean that automatic upgrade may occur for this base image to any latest minor and/or patch version under a given major version of the base image, while placing the indicator at the <patch> location may mean that automatic upgrade of the associated base image is allowed only for an upgraded patch version.

The engine that runs the container from the associated image can detect the indicator, and during runtime, check and download the latest version automatically, compose the layers of the container together with the downloaded ones, and restart the container quickly. A rollback mechanism is also disclosed herein which allows quick rollback of the updated container by, in part, backing up setup of the original working container prior to starting the updated container.

As noted, disclosed herein is an automatic update or upgrade facility for a container-based processing environment which allows, for instance, container processing to upgrade its image layer automatically with little or no down time. By adding an version update indicator in association with a FROM instruction of the configuration file, a container is allowed to download the latest version of the base image while running. Instead of rebuilding the referenced base image, the container is allowed to compose the latest layers with other existing layers within the container to allow runtime upgrade of the software running on it.

Figure 4A:
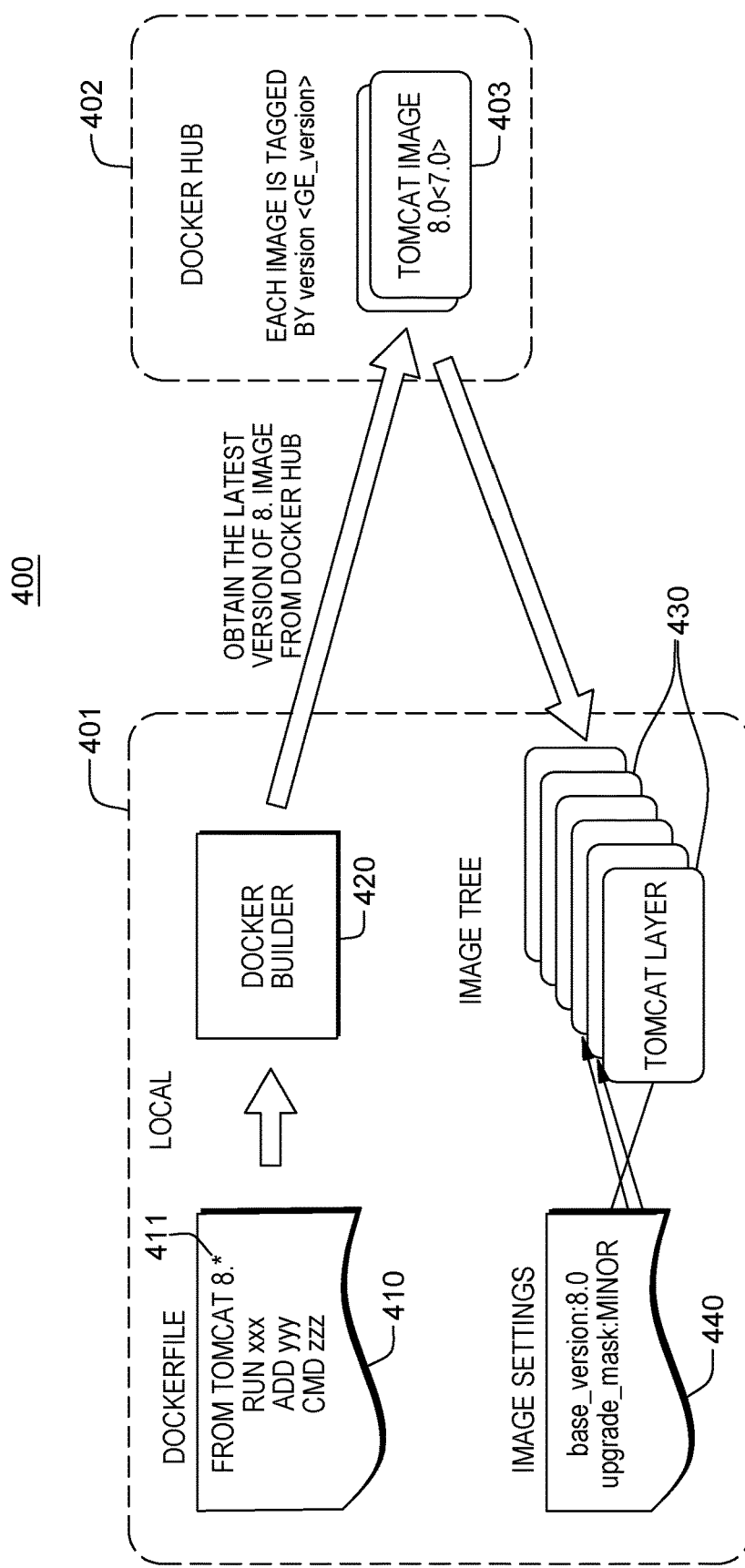
FIGS. 4A & 4B depict one embodiment of a process for building an image with automatic base image update(s) specified, in accordance with one or more aspects of the present invention.
Figure 4B:
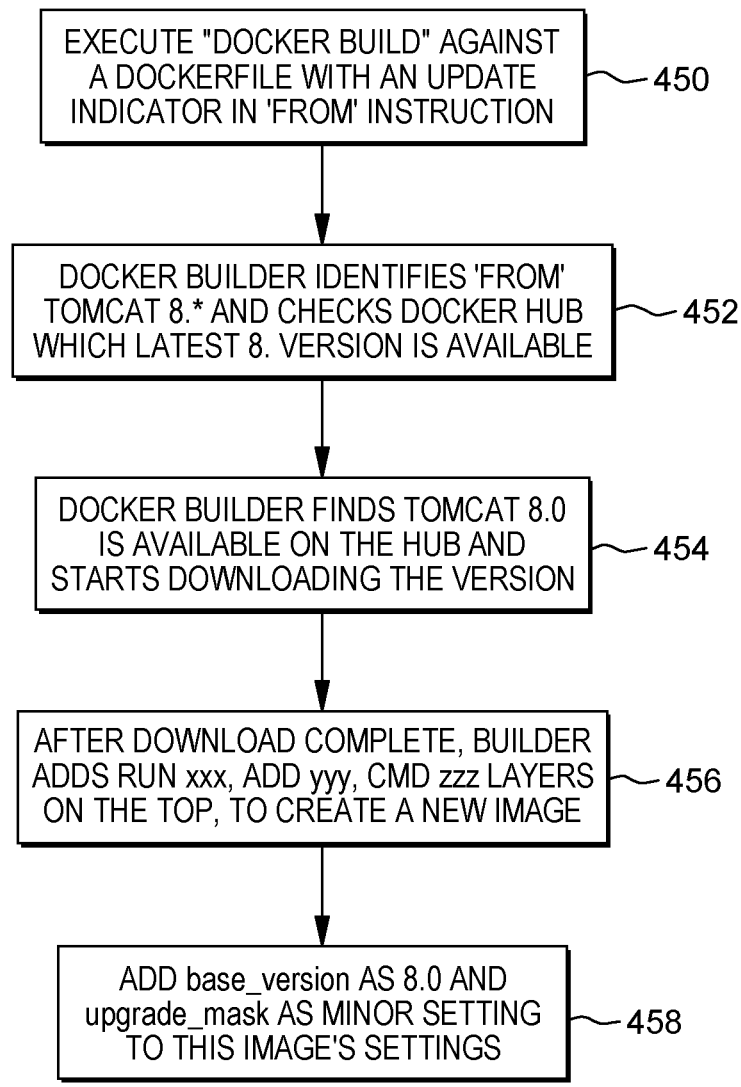

FIGS. 4A & 4B depict one embodiment of a process for building an image in a container-based processing environment where an automatic update indicator is allowed in association with a "FROM" instruction, as disclosed herein. In FIG. 4A, the container-based processing environment 400 includes a local processing environment, which may be performing a Docker build, as well as a Docker Hub 402, which includes images, such as Tomcat image 8.0<7.0>403. In one or more implementations, each image 403 in Docker Hub 402 may be tagged with a <version> number and a <GE_version>, where "GE" refers to greater-than-or-equal-to. The local processing environment 401 includes a Dockerfile 410 referenced by a Docker Builder 420. The Dockerfile in this example includes a referenced instruction "FROM Tomcat 8.*", with the "*" being an example of an automatic update indicator, such as discussed herein. With this instruction, Docker Builder 420 obtains the latest version of the Tomcat 8. image from Docker Hub 402 to build an image tree 430. Processing also tracks the image settings 440 with, for instance, the image settings 440 registering the downloaded image's version as base_version, upgrade_mask records, which identify a range of changes that should be applied.

Referring collectively to FIGS. 4A & 4B, in one or more implementations, building an image may include executing a Docker build against a Dockerfile with an update indicator (*) in a FROM instruction 450 (FIG. 4B). For instance, in the example depicted in FIG. 4A, the "FROM Tomcat 8.*" instruction lets the Docker engine (i.e., Docker builder) pickup any change before a Tomcat 9. version. This particular use of the indicator implies using the latest 8. version to build a new version, as explained herein. The Docker builder identifies "FROM Tomcat 8.*" and checks the Docker Hub for a latest 8. version of the image that is available 452 (FIG. 4B). In this example, an assumption is made that Tomcat 8.0 is available on the Hub, and the Docker Builder downloads the corresponding layers to the local processing environment 454, and then adds the RUN xxx, ADD yyy and CMD zzz layers to form the new image 456. Additionally, processing registers the base_version number as 8.0 and the upgrade_mask as minor to the settings of this image 458. Note that the upgrade_mask is minor in this example based on the location of the "*" indicator 411 (FIG. 4A) in Dockerfile 410. That is, the indicator 411 is this example is after the <major> number.

As explained herein, in one or more implementations, base_version, upgrade_mask and GE_version may be used to facilitate safe automatic updating of a container. This is explained further below with reference to FIGS. 5A-5C.

In FIGS. 5A & 5B, an exemplary push command is shown between a Docker Image Vendor 500 and a Docker Hub 510. As illustrated, the Docker Image Vendor 500 may tag the image with a current version and the earliest upgrade compatible version, with Tomcat image being shown again by way of example only. At Docker Hub 510, each image is thus tagged by <version><GE_version>, with different Tomcat images being referenced using this format in FIG. 5B. Note that the image maintainer can obtain this information from the software release or patch notes. Thus, the automatic update process can be trusted. If an extra version number is available, the automatic upgrade may file this, instead of obtaining the latest version. Typically, the software vendor knows that a new release is backward compatible with certain previous versions. The GE_version provides the image publisher with a mechanism to expose this information to the container world (e.g., via Docker Hub). In the example provided, Tomcat 8.0 has GE_version 7.0. This means a container setting with base_version 7.0 or above is eligible for this upgrade.

Figure 5C:
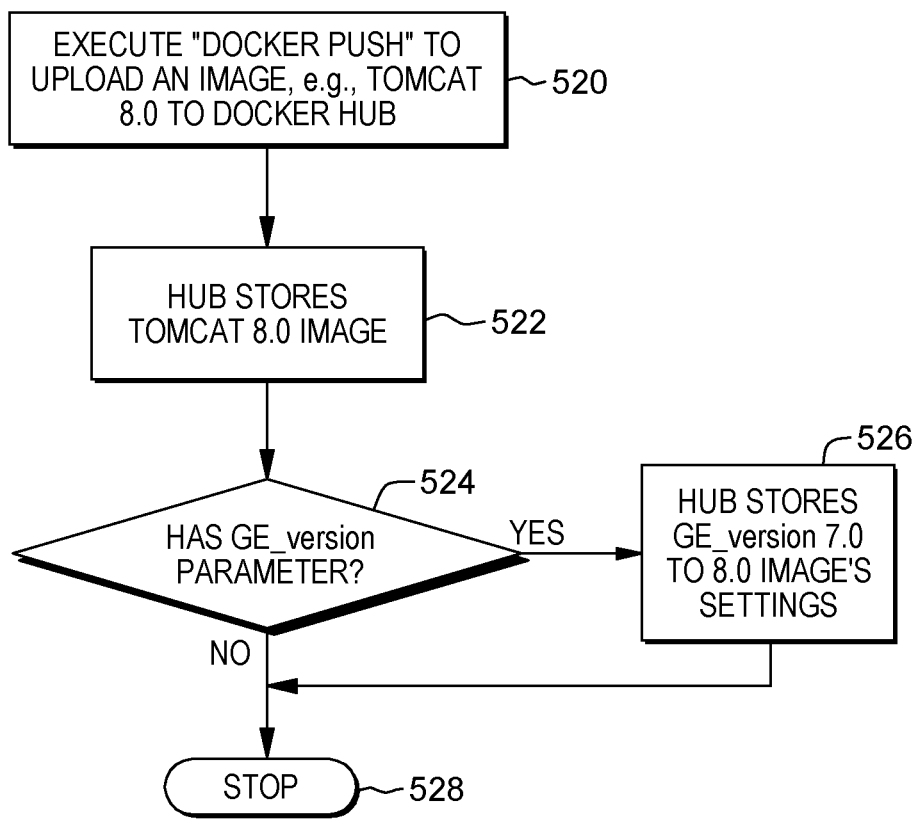

FIG. 5C depicts one embodiment of processing for pushing an image to a Docker Hub, such as described herein. A Docker push command is executed to upload an image, e.g., Tomcat 8.0 to Docker Hub 520. The Hub stores the Tomcat 8.0 image 522, as usual. Processing also determines whether there is a GE_version parameter associated with the push command 524. If "yes", then the hub stores the GE_version (7.0 in this example) to Tomcat 8.0 image's settings 526, which completes the push process 528.

Figure 6A:
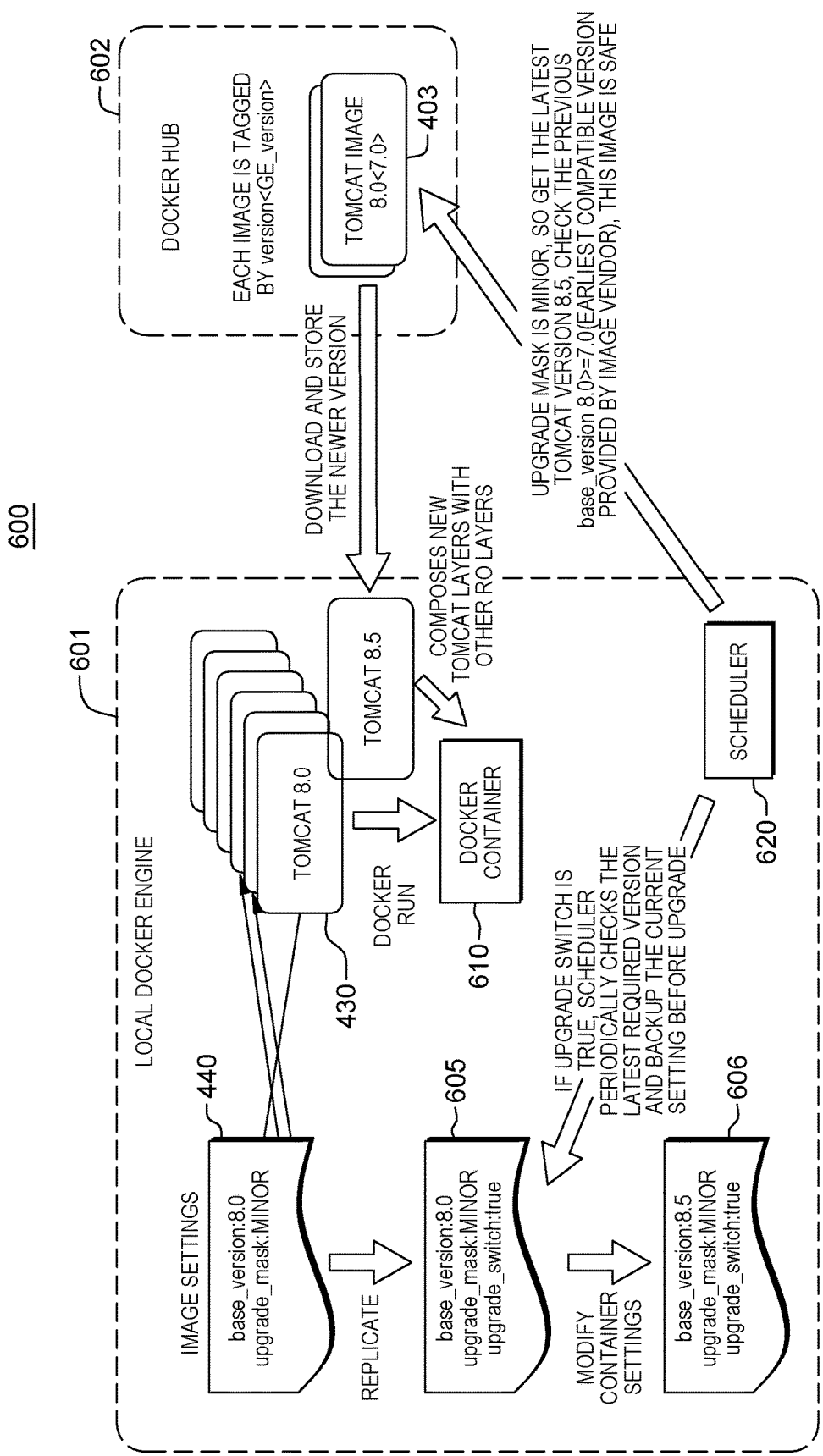
FIGS. 6A & 6B depict one embodiment of runtime processing of a container with automatic update specified, in accordance with one or more aspects of the present invention.
Figure 6B:
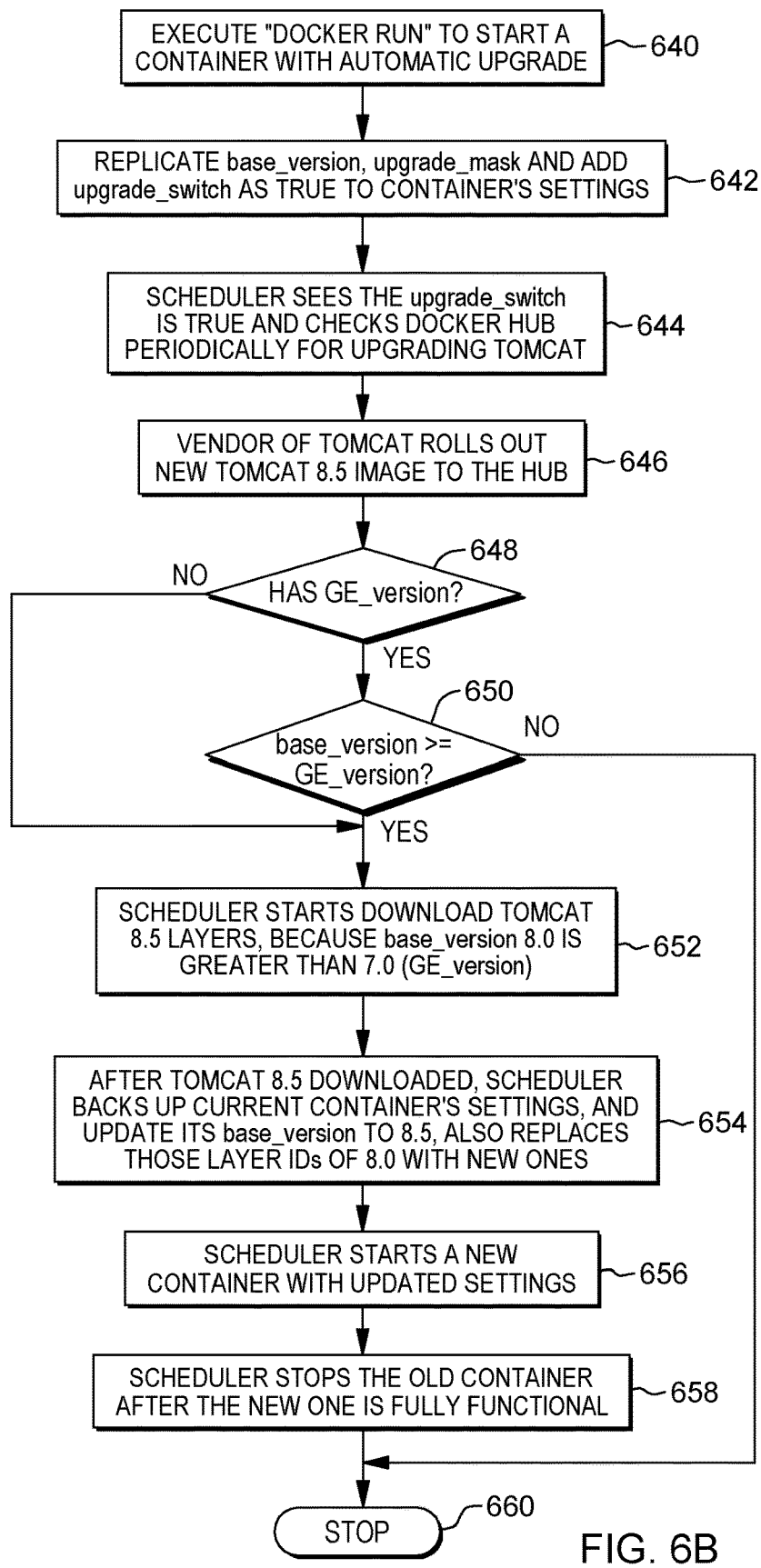

FIGS. 6A & 6B depict one embodiment of a process for running a container with an automatic update facility, in accordance with one or more aspects of the present invention. As illustrated, the container-based environment 600 of FIG. 6A, includes a local Docker engine 601 and a Docker Hub 602. The local Docker engine 601 has image settings 440 for image layers 430 of a container to be run 610. In operation, scheduler 620 may periodically check for updates or upgrades to one or more of the image layers associated with the running container. For instance, when issuing the Docker run, if there is no Tomcat 8.5 available, then the Docker engine starts the container as usual, and adds version_number: 8.0, upgrade_mask: minor and upgrade_switch: true to the replicated container setting. Since the upgrade_switch is true (i.e., the update indicator is provided or set), scheduler 620 may periodically check Docker Hub 602 for a newer version of the referenced image. In one or more implementations, the scheduler may check for updates based on user configuration, which could be, for instance, daily, weekly, monthly, yearly, or could be manually directed by an operator. Once the scheduler identifies, for instance, Tomcat 8.5 is at the Docker Hub, and its minor upgrade matches the upgrade_mask, Docker engine 601 will download the corresponding layers from the Docker Hub 602. When the download is complete, Docker engine 601 will backup the current application container settings, and modify the container settings by updating the base_version to 8.5, and then restart the updated container with the Tomcat 8.5 layers incorporated within the container, and with the modified container-image settings being saved 606.

FIG. 6B depicts a detailed processing example of running a container with an automatic upgrade facility such as disclosed herein. A Docker run is executed to start a container with an automatic update indicated 640. Processing replicates the base_version, and an upgrade_mask to the container's settings and adds upgrade_switch true (meaning the automatic update indicator was set with the building of the container's image) 642. The scheduler identifies that the upgrade_switch is true, and checks the Docker Hub periodically for upgrades, such as updates in the example discussed to the Tomcat image 644. The vendor of the Tomcat image may roll out a new Tomcat 8.5 image to the Docker Hub 646, for instance, during running of the container. Processing determines whether there is an associated GE_version 648, and if yes, determines whether the base_version is greater than or equal to the GE_version 650. If so, the scheduler starts to download the updated image layers, for instance, the Tomcat 8.5 layers in this example, since the base version 8.0 is greater than 7.0 (GE_version) 652. After the Tomcat 8.5 image is downloaded, the scheduler backs up the current container settings and updates its base_version to 8.5, also replacing those layer IDs of 8.0 with the new layer IDs 654. The scheduler starts the new or updated container with the updated settings 656, and stops the old application container after the new one is fully functional 658, which completes the update process in one embodiment.

Figure 7A:
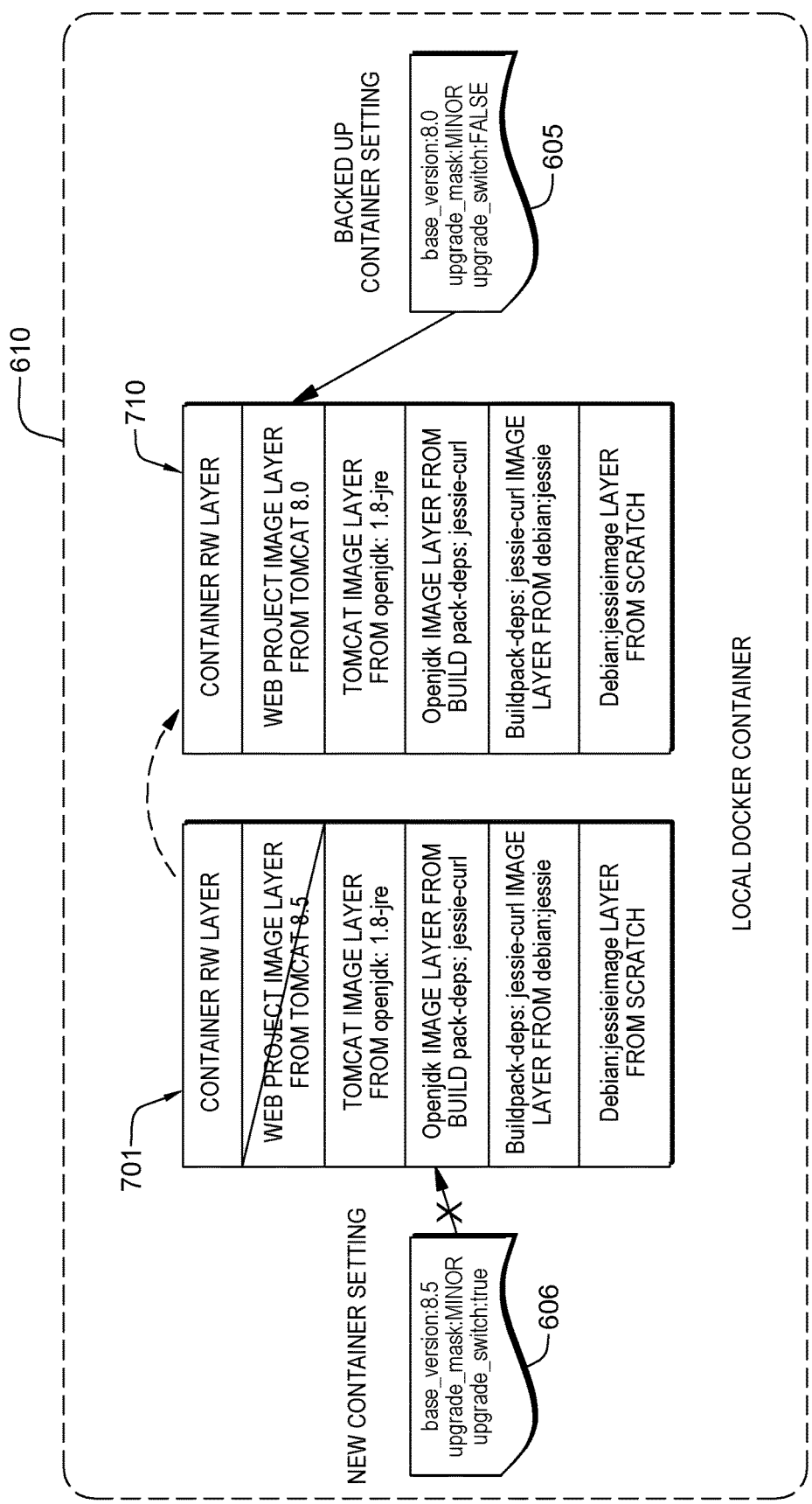
FIGS. 7A & 7B depict one embodiment of a process for rolling back container settings upon detection of a problem with running of an updated container, in accordance with one or more aspects of the present invention.

With the processing disclosed herein, it is conceivable that an error may be introduced where the container composes the layers, instead of first building an updated version of the container image from a Dockerfile. Therefore, in one or more aspects, a new command line, such as "Docker rollback", may be provided to account for an issue with running of the updated container. Although the above-described GE_version approach safeguards against unwanted upgrades to a base image version, an issue could conceivably still arise as a result of the update. A rollback command may use the backup copy to restore the previously workable application container, and may set the upgrade_switch to false to disable the unexpected unsafe upgrade from occurring again. FIG. 7A depicts operation for a rollback command where an updated container 701 is being rolled back to an original application container 710, and where the updated or new container settings 606 are replaced by the backup container settings 605 of the original container. In this case, the updated Tomcat 8.5 image layers are rolled back to the original Tomcat 8.0 image layers, which as noted above may be referenced via the backed-up container settings saved during the automatic updating process.

Figure 7B:
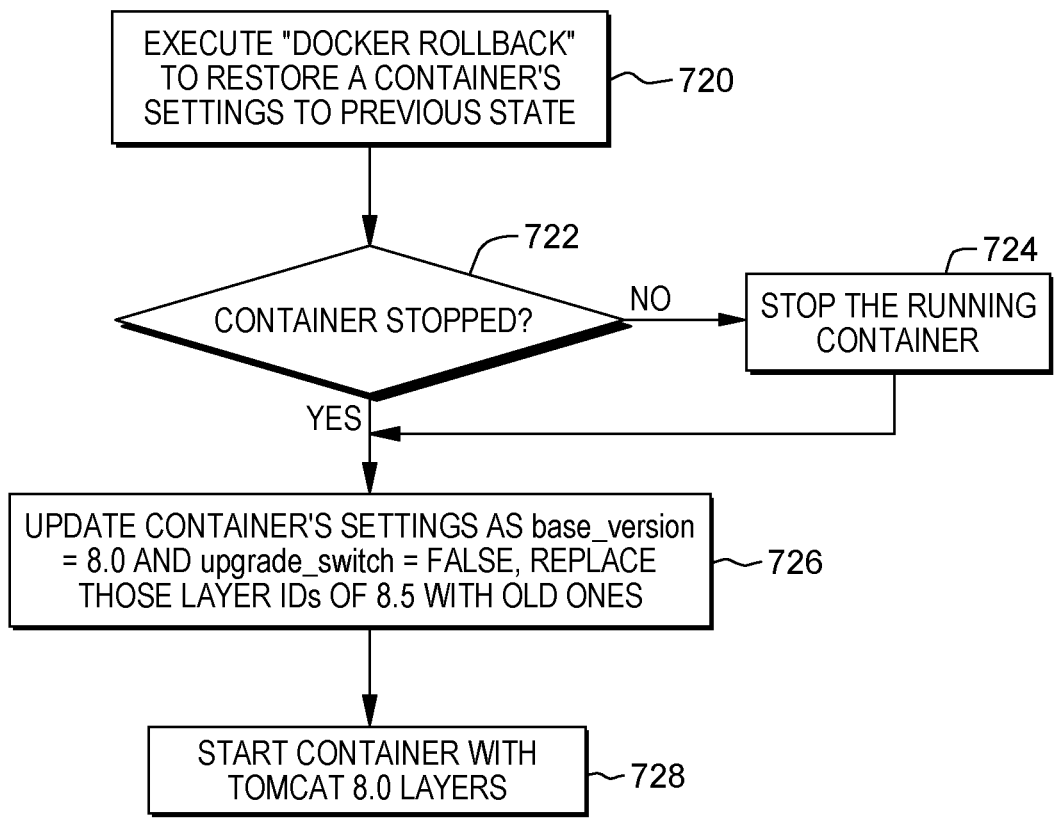

One embodiment of the process is depicted in FIG. 7B. The Docker rollback command is executed to restore the container's settings to the previous state 720. Processing determines whether the container is still running or is stopped 722. If the container is not stopped, then processing stops running of the updated container 724. The settings for the container are then rollbacked to base_version=8.0, and the upgrade_switch is set to false. The corresponding layer IDs of the Tomcat image 8.5 are replaced with the Tomcat image 8.0 layer IDs 726, and the rollbacked container with the Tomcat 8.0 layers (this example) is started 728. One or more aspects of the rollback process disclosed herein may be automatically and/or manually implemented, as desired.

Those skilled in the art will note from the above description that provided herein are a computer-implemented method, system and computer program product for facilitating processing within a container-based processing environment. Processing is facilitated by providing an automatic upgrade facility by the container's image developer. In one or more implementations, the method includes providing an application container, where the application container has an associated configuration file with automatic updates specified in connection with a referenced based image. The application container includes an existing version of the base image. The method also includes identifying availability if an updated version of the base image within the container-based processing environment, and based on identifying availability of the updated version of the base image, automatically updating the application container to an updated container. The updated container includes the updated version of the base image. In one or more implementations, providing the application container may include running the application container, and the identifying may occur in association with the running of the application container. For instance, the automatically updating the application container may occur within a runtime environment of the application container, without requiring full replacing of the existing version of the base image within the container-based processing environment outside the runtime environment.

In one or more implementations, running of the container is within a runtime environment, and the method further includes backing up settings of the application container based on the identifying, and starting running of the updated container. Further, based on the running of the updated container, running of the application container may be stopped. In one or more implementations, an issue may be identified with running of the updated container subsequent to starting running of the updated container. Based on identifying an issue with running of the updated container, processing may automatically rollback the updated container to the original application container. The automatically rolling back may include reestablishing the application container, at least in part, from the backup settings of the original application container.

In one or more implementations, the automatically updating includes replacing a container layer of the application container referencing the existing version of the base image with a container layer referencing the updated version of the base image. By way of example, the container layer may be a read only layer of the application container.

In one or more embodiments, the associated configuration file may include a FROM instruction referencing the base image, and the automatic update specified may be an automatic update indicator associated with a FROM instruction. In one or more implementations, the base image may have a multi-level version scheme, and the automatic update indicator may indicate a particular level of the multi-level version scheme for the base image which may be automatically updated within the application container.

Advantageously, with an automatic update facility such as disclosed herein processing within a container-based processing environment is enhanced by allowing automatic updates of one or more base images within an existing container, such as a running container. A base image version can be automatically specified for upgrade by the developer's requirement, that is, by using an update indicator such as disclosed herein. Further, different base images may be composed other than through the build process, thereby saving container restart time. The container, such as a Docker container, is allowed to upgrade itself, and keep the original image unchanged. This means only the runtime environment is changed, but local disk and Docker Hub would not be affected by the changes.

One or more aspects of the present invention are inextricably tied to computer technology and facilitate processing within a computer, improving performance thereof. Further details of embodiments of facilitating processing within a computing environment, as it relates to one or more aspects of the present invention, are described herein. Advantageously, in one or more aspects, facilitating processing within a computing environment is supported in which all-in-one image creation is provided for the purpose of demo, PoC learning, or a low cost option for startup applications, etc. Further, the facility disclosed herein supports flexibility for container-based image authoring, such as for a Docker container-based image by Dockerfile authoring. Advantageously, by enhancing processing within the container-based processing environment, processing cost and time are saved in, for instance, updating of a running container.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
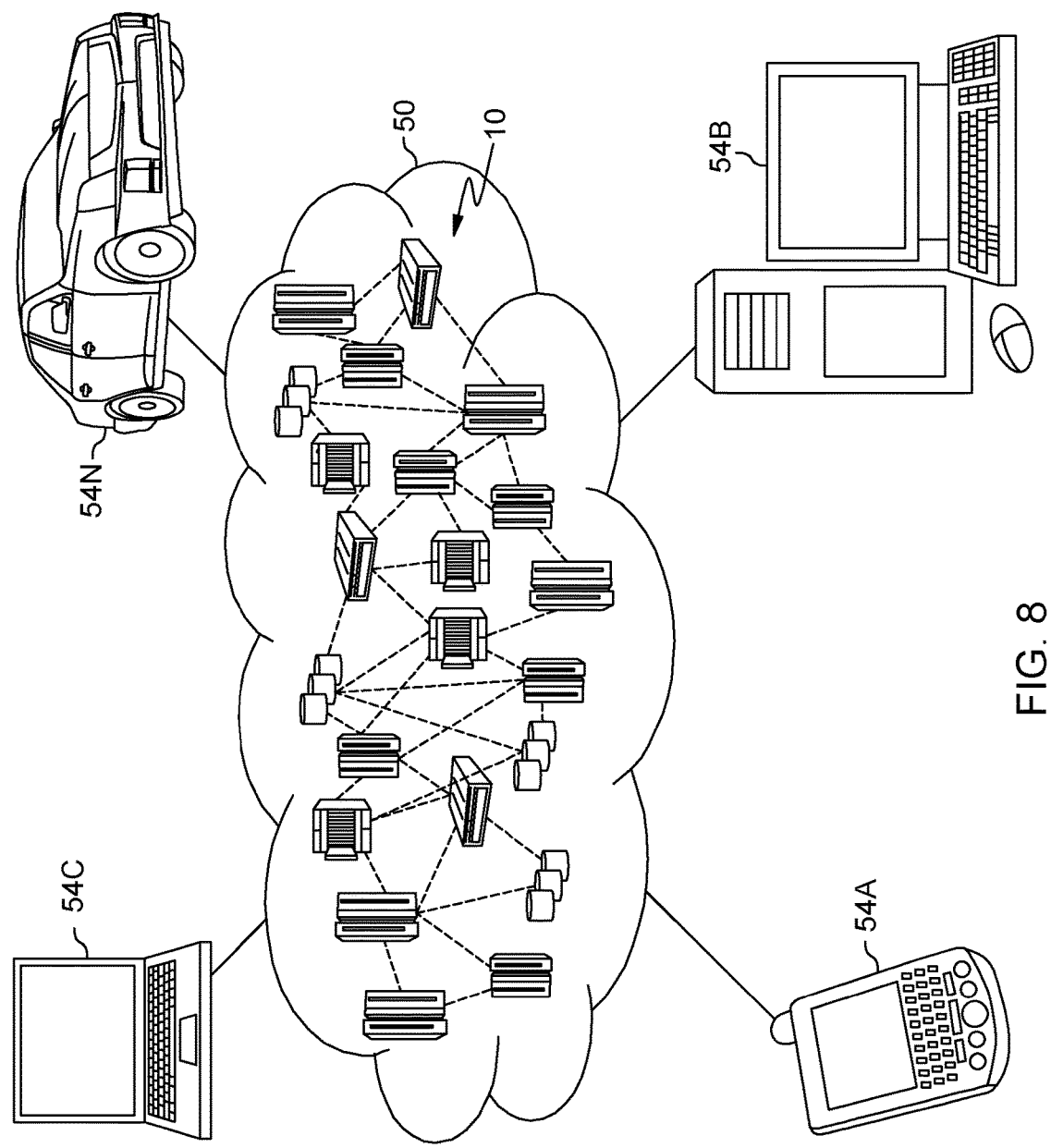
FIG. 8 depicts one embodiment of a cloud computing environment which may facilitate implementing, or be used in association with, one or more aspects of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 9:
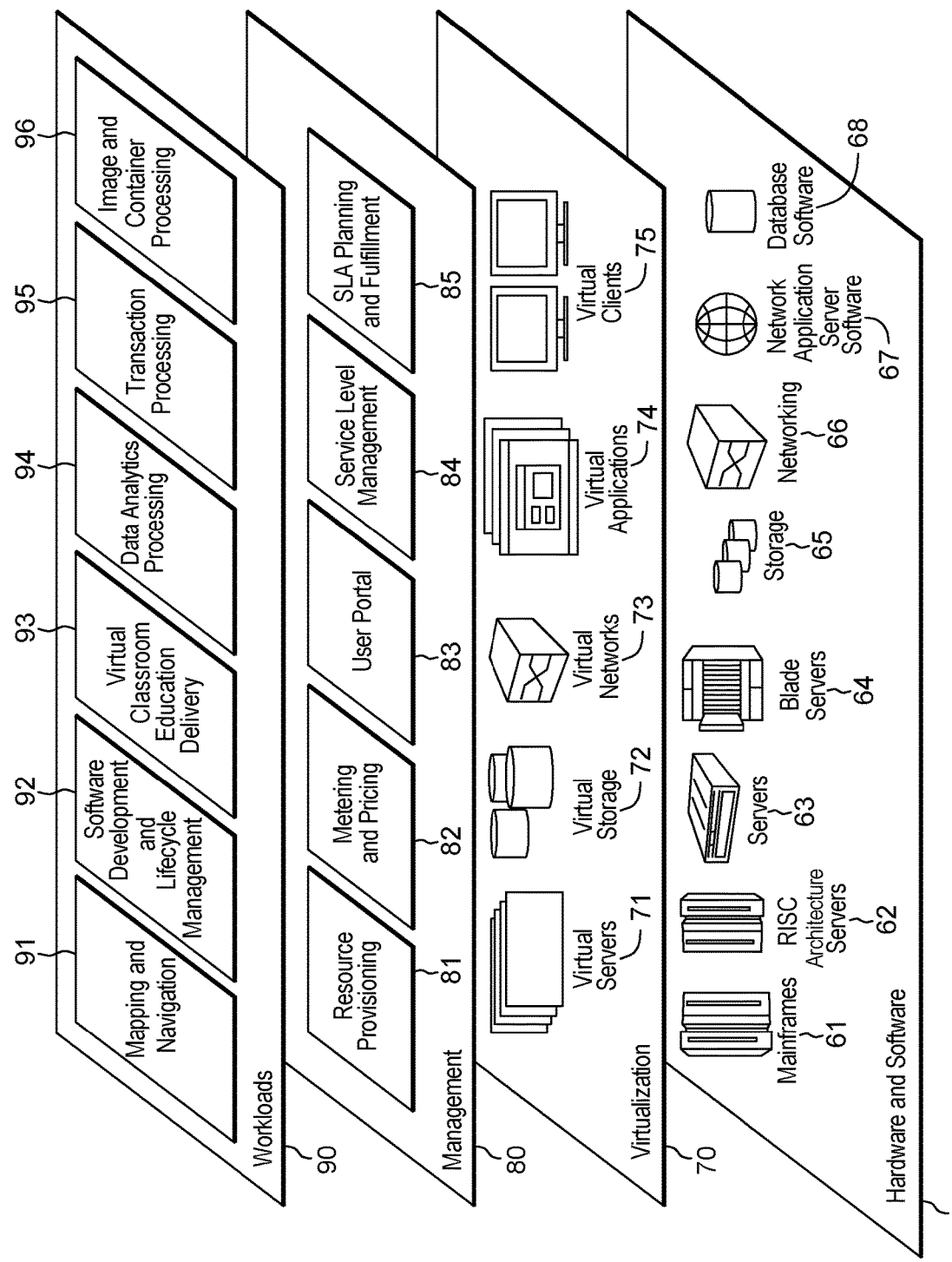
FIG. 9 depicts an example of extraction model layers, which may facilitate implementing processing within a container-based data processing system, in accordance with one or more aspects of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image and/or container processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used, if desired.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a container-based processing environment, the computer-implemented method comprising:
   providing an application container, the application container having an associated configuration file with automatic update specified in connection with a referenced base image, the automatic update specified including a version update indicator identifying a range of base image updates to be automatically applied during runtime, the application container including an existing version of the base image;
   running the application container with the existing version of the base image;
   identifying, in association with the running the application container, availability of an updated version of the base image within the container-based processing environment which is to be runtime incorporated into the application container based, in part, on the version update indicator in the configuration file;
   based on identifying availability of the updated version of the base image, and based on the automatic update specified in connection with the base image, automatically updating the application container to an updated container, including replacing a container layer of the application container referencing the existing version of the base image with a container layer referencing the updated version of the base image to obtain the updated container, the updated container including the updated version of the base image and the existing version of the base image; and
   wherein the automatically updating the application container occurs within a runtime environment of the application container.

2. The computer-implemented method of claim 1, wherein the automatically updating the application container occurs without requiring full replacing of the existing version of the base image within the container-based processing environment outside the runtime environment.

3. The computer-implemented method of claim 1, wherein the running of the container is within the runtime environment, and the computer-implemented method further comprises:
   backing up settings of the application container based on the identifying;
   starting running of the updated container; and
   stopping running of the application container based on the running of updated container.

4. The computer-implemented method of claim 3, further comprising:
   identifying an issue with the running of the updated container subsequent to starting running of the updated container; and
   based on the identifying of the issue with running of the updated container, rolling back the updated container to the application container, the rolling back comprising reestablishing the application container, at least in part, from the backup settings of the application container.

5. The computer-implement method of claim 1, wherein the container layer is a read only layer of the application container.

6. The computer-implemented method of claim 1, wherein the associated configuration file includes a FROM instruction referencing the base image, and the automatic update specified is an automatic update indicator associated with the FROM instruction.

7. The computer-implemented method of claim 6, wherein the base image has a multi-level version scheme, and the automatic update indicator indicates a particular level of the multi-level version scheme for the base image which may be automatically updated within with the application container.

8. A system for facilitating processing within a container-based processing environment, the system comprising:
   a memory; and
   a processing circuit communicatively coupled with the memory, wherein the system performs a method comprising:
      providing an application container, the application container having an associated configuration file with automatic update specified in connection with a referenced base image, the automatic update specified including a version update indicator identifying a range of base image updates to be automatically applied during runtime, the application container including an existing version of the base image;
      running the application container with the existing version of the base image;
      identifying, in association with the running the application container, availability of an updated version of the base image within the container-based processing environment which is to be runtime incorporated into the application container based, in part, on the version update indicator in the configuration file;
      based on identifying availability of the updated version of the base image, and based on the automatic update specified in connection with the base image, automatically updating the application container to an updated container, including replacing a container layer of the application container referencing the existing version of the base image with a container layer referencing the updated version of the base image to obtain the updated container, the updated container including the updated version of the base image and the existing version of the base image; and
      wherein the automatically updating the application container occurs within a runtime environment of the application container.

9. The system of claim 8, wherein the automatically updating the application container occurs without requiring full replacing of the existing version of the base image within the container-based processing environment outside the runtime environment.

10. The system of claim 8, wherein the container layer is a read only layer of the application container.

11. The system of claim 8, wherein the associated configuration file includes a FROM instruction referencing the base image, and the automatic update specified is an automatic update indicator associated with the FROM instruction.

12. The system of claim 11, wherein the base image has a multi-level version scheme, and the automatic update indicator indicates a particular level of the multi-level version scheme for the base image which may be automatically updated within with the application container.

13. A computer program product for facilitating processing within a container-based processing environment, the computer program product comprising:

a computer readable storage medium readably by a processing circuit and storing instructions for execution by the processing circuit which, when executed, perform a method comprising:

providing an application container, the application container having an associated configuration file with automatic update specified in connection with a referenced base image, the automatic update specified including a version update indicator identifying a range of base image updates to be automatically applied during runtime, the application container including an existing version of the base image;

running the application container with the existing version of the base image;

identifying, in association with the running the application container, availability of an updated version of the base image within the container-based processing environment which is to be runtime incorporated into the application container based, in part, on the version update indicator in the configuration file;

based on identifying availability of the updated version of the base image, and based on the automatic update specified in connection with the base image, automatically updating the application container to an updated container, including replacing a container layer of the application container referencing the existing version of the base image with a container layer referencing the updated version of the base image to obtain the updated container, the updated container including the updated version of the base image and the existing version of the base image; and wherein the automatically updating the application container occurs within a runtime environment of the application container.

14. The computer program product of claim 13, wherein the associated configuration file includes a FROM instruction referencing the base image, and the automatic update specified is an automatic update indicator associated with the FROM instruction.

15. The computer program product of claim 14, wherein the base image has a multi-level version scheme, and the automatic update indicator indicates a particular level of the multi-level version scheme for the base image which may be automatically updated within with the application container.

* * * * *